United States Patent [19]
Wolfe

[11] 3,836,691
[45] Sept. 17, 1974

[54] FILM ADVANCING SYSTEM FOR PHOTOGRAPHIC CAMERAS

[76] Inventor: Maynard Frank Wolfe, 18 B Venice Ct., 41 Conduit Rd., Sai Ying Pun, Hong Kong

[22] Filed: June 15, 1972

[21] Appl. No.: 262,997

[30] Foreign Application Priority Data
June 17, 1971 Great Britain .................. 28486/71

[52] U.S. Cl. .............................................. 354/213
[51] Int. Cl. ........................................... G03b 19/04
[58] Field of Search ................. 95/11, 31; 354/213

[56] References Cited
UNITED STATES PATENTS
1,535,930  4/1925  MacDonald ........................... 95/31
2,307,646  1/1943  Sonne .................................. 95/125
2,574,392  11/1951 Huebner ............................. 355/29

*Primary Examiner*—John M. Horan

[57] ABSTRACT

A film advancing system for a camera in which the number of film frames exposed is indicated by a marked tape that is wound in unison with the film upon a compartmented take-up spool. As each frame length of film is presented at the exposure zone, the spool is locked by the action of a releasable spring-loaded plunger that inserts through an opening in the tape.

1 Claim, 7 Drawing Figures

PATENTED SEP 17 1974 3,836,691

FILM ADVANCING SYSTEM FOR PHOTOGRAPHIC CAMERAS

BACKGROUND AND SUMMARY OF THE INVENTION

The present invention relates in general to cameras and more particularly to a film advancing system for a camera whereby the number of film frames exposed are indicated and the film advancement is releaseably locked as each frame length is presented at the exposure zone.

In the prior art, there are many known cameras which feature means for indicating what frames have been exposed and for locking the advancement of the film to assure exposure of exactly one frame at a time. However, these prior art cameras accomplish such results with relatively complex and expensive film advancement mechanisms.

The invention provides a means of simplified construction and highly reduced cost, especially intended for incorporation in "dosposable" type cameras, for metering the photographic film onto the take-up spool.

It is, of course, very well known to meter photographic film onto the take-up spool and to provide automatic locking means in a camera whereby each film frame is locked in proper exposure position until it is desired to advance the film to the succeeding frame. The known means, however, involve either a relatively complex system in which the film is provided with perforations which cooperate with corresponding sprocket wheels, rollers, or gears in the camera itself, or the application to the film of a numbered paper backing which renders the film relatively expensive. Such known means, therefore, involve a cost which generally precludes their incorporation into disposable or one-time use cameras.

It is to be understood that "disposable" type cameras, within the context of this application, applies to pre-loaded cameras which are to be thrown away after the one roll of pre-loaded film has been used.

An object of the invention is simply that of realizing a film metering means which eliminates the conventional sprocket wheels, gears, and other devices from the camera and which also eliminates the need for a film with a numbered backing.

A corollary object is that of realizing a film metering means of such simplicity and reduced cost as to render it feasible for disposable type cameras.

According to the present invention there is provided a still camera including a housing and means therein for storing and for winding a film roll and an indicating tape with said roll and tape being maintained separately from each other, said tape bearing markings thereon corresponding to successive frames of said roll, and means to view said markings.

Preferably, the camera includes releasable cooperating means on said housing and on said tape for locking said tape in respective positions corresponding to successive frames of said roll. The cooperating means may include perforations along the length of said tape and a spring biased plunger means on said housing arranged to lockingly enter respective ones of said perforations pursuant to advancement of said tape past said plunger means. The winding means may comprise a common wind-up spool having axially successive portions respectively for winding said tape and said roll thereon.

Thus, the invention provides a film advancing system for a camera whereby the number of film frames exposed is indicated by a marked tape that is wound in unison with the film upon a compartmented take-up spool. In addition to serving as an indicator, this tape has a series of openings spaced apart from one another lengthwise a distance corresponding to the length of a single frame. As each frame length of film is presented in succession at the exposure zone, the spool is locked, to prevent film wastage, by the action of a releasable spring-loaded plunger that inserts through a corresponding opening in the tape. After a given frame is exposed, the plunger is released manually and the spool is turned to take up more film and tape until stopped again by the insertion of the plunger into the next tape opening. One of the economic advantages of the improved film advancement system of the invention is that it operates independently of the camera lenses and shutter.

For a better understanding of the invention, reference should be had to the accompanying drawing and following detailed description pertaining to a preferred embodiment of the invention.

BRIEF DESCRIPTION OF A PREFERRED EMBODIMENT OF THE INVENTION

Figure 1:
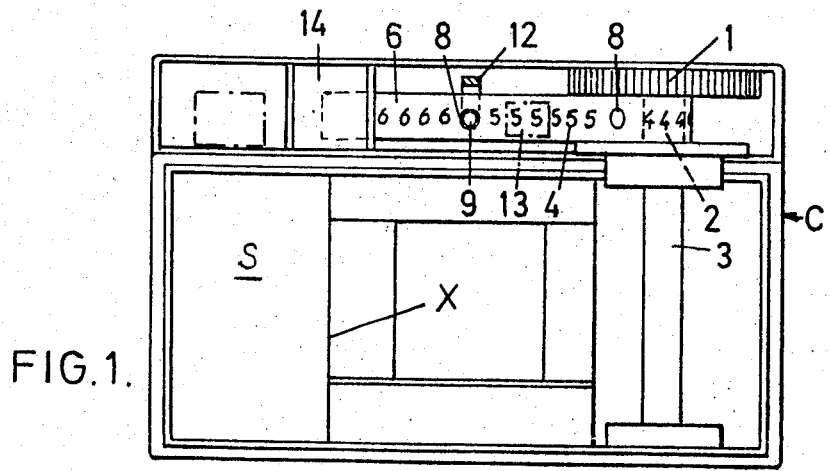
FIG. 1 is a rear elevation view of a camera incorporating the improved film advancement system according to a preferred embodiment of the invention.
Figure 2:
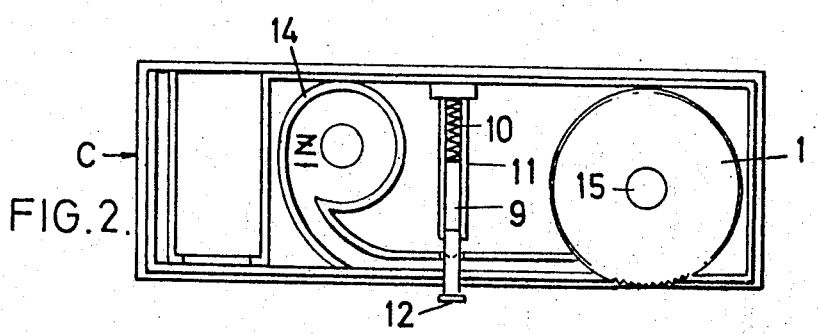
FIG. 2 is a plan view of the camera of FIG. 1.
Figure 4:
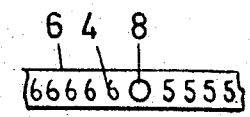
FIG. 4 illustrates the relative sizes of film and metering tape in accordance with the invention.

As illustrated in FIGS. 1 and 4, the film advancing system of invention utilizes a tape 6, of substantially nonstretchable material and of substantially the same thickness as the film which is to be used. Said tape 6 and the film 7 are separate from each other although they are correlated or synchronized with each other so that the markings on the tape correspond to particular frames of the film.

Figure 3:
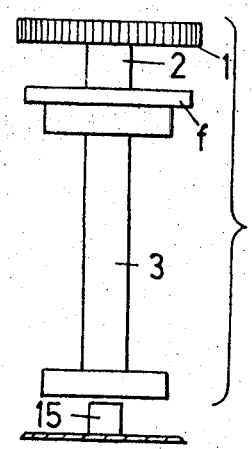
FIG. 3 is an elevation view of a take-up spool used in the camera of FIGS. 1 and 2.
Figure 5:
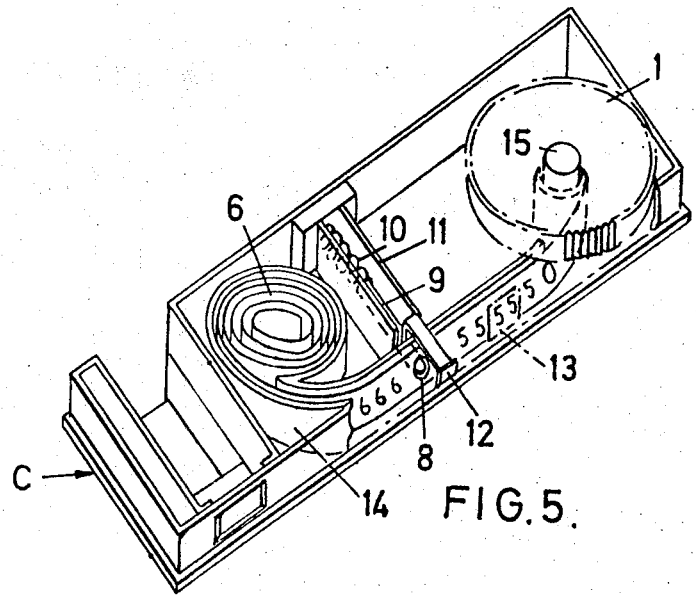
FIGS. 5 and 6 are cut-away isometric views illustrating the interior of a camera having the present invention incorporated therein.
Figure 6:
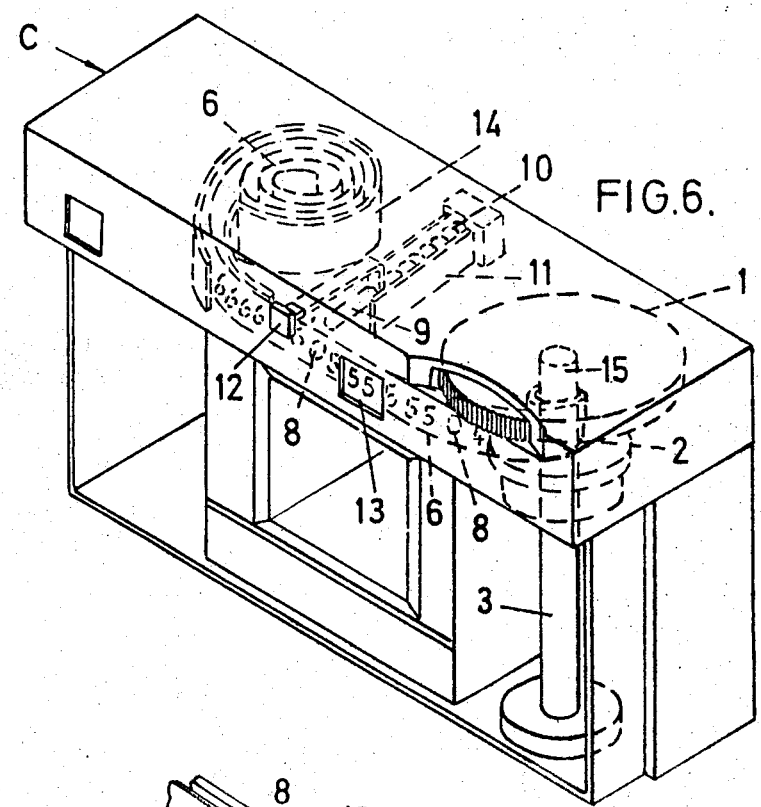
Figure 7:
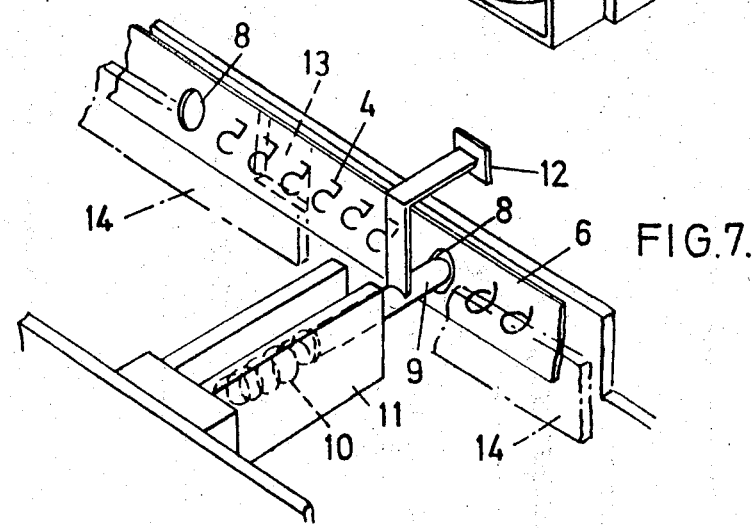
FIG. 7 is a detail isometric view of a locking mechanism according to the invention.

As viewed from the back (FIGS. 1, 5 and 6) the film roll 7 and the tape roll 6 are placed in the left hand side compartment S of the camera C, substantially coaxially with each other although not necessarily so. The film and tape are extended across the back of the camera to the take-up spool 5 which is divided into two coaxial, lengthwise sections 2 and 3, shown in FIG. 3, respectively, for the tape and the film. A flange "f" may separate the portions 2 and 3. Said spool, further, is fixedly attached at one end to winding knob 1 which the operator manipulates in order to wind the film onto the spool. Knob 1 could be substituted by a lever or other analogous device.

The tape 6 includes suitable markings, such as numerals 4, visible through window 13 for indicating the film frames either wound or to be wound. Further, the tape preferably includes perforations 8, suitably spaced along the tape length, onto which the plunger 9, urged by spring 10, may extend in order to lock the tape and thereby the spool 5 and the film 7, at each film frame for taking a picture. When it is desired to advance to the succeeding film frame, the operator simply pushes or pulls backwards on button 12, which is attached to plunger 9, to withdraw said plunger from hole 8 whereby tape 6 may be wound onto spool portion 2. Once hole 8 has passed the position of plunger 9, the button 12 may be released since the end of plunger 9 will simply slide against the surface of tape 6 until the next succeeding hole 8 comes into alignment with the plunger. At this point, of course, the plunger 9 slides into said hole 8 and thereby again locks the tape, spool, and film in proper position for another picture to be taken.

If desired, tape 6 may be provided devoid of any holes 8 so that any length of film may be wound onto spool 5 without interruption and in this case, of course, no plunger is required.

The measuring or metering tape 6 is or can be stored and guided past the pin 9 in a chamber with guide paths similar to those indicated at 14 and may either be coiled upon itself or wound on a core. The pin, plunger or finger 9, with the release button 12 and spring 10 can be housed as indicated at 11 in the drawings but alternate ways can be utilized. The take-up spool 5 can be made in one or more sections so long as they are linked so that the tape 2 and the film 3 channels move together when knob 1 is activated. Furthermore, many types of simple clutch devices 15 can be used to prevent the take-up spool 5 from back-winding or unrolling the tape 6 and film 7.

This invention will make it possible to use film material 7 of many different thicknesses and widths in cameras that are to be produced with film transport and frame counting mechanisms.

From the foregoing description, it can be noted that the film advancing system of the invention basically provides means (spool 5 and knob 1) for advancing the film 7 from a freash film storage zone S to an exposure zone X and thence to an exposed film storage zone, which is the section 3 on spool 5. The spool 5 and knob 1 also serve as means for advancing the indicator tape 6 from a supply zone, i.e., the chamber Z to a storage zone, i.e., spool section, along a guided path 14 that transits a viewing zone, i.e., window 13. Essentially, the tape advancing means and the film advancing means are coupled for operation in unison to present at the viewing zone a section of tape 6 having markings 4 corresponding to the number of the film 7 frame at the exposure zone X, and thus indicating the number of frames which have already been exposed.

While a specific embodiment of the invention has been shown and described in detail to illustrate the application of the principles of the invention, it will be readily understood and appreciated that various changes or modifications thereof may be made without departing from the spirit or scope of the invention.

What I claim is:

1. In a camera having a housing and means therein for storing and winding a film roll, the improvement which comprises an indicating tape disposed in said housing in a tape compartment adjacent to but separate from the film roll, said tape bearing markings thereon corresponding to successive frames of said film roll and apertures spaced-apart along the length of the tape at distances corresponding to the actual spacing between consecutive frames of film, spool means disposed in said housing and operable by manual means to wind the film and tape in unison without interwinding onto two respective axially successive separated portions of the spool means, releaseable lock means disposed in said tape compartment of the housing and including a plunger biased to enter and extend through said tape apertures one at a time to lock winding of the tape and thereby lock the winding of the film upon the winding of each frame of film, and window means in said tape compartment permitting said tape markings to be viewed to indicate the number of frames exposed.

* * * * *